United States Patent
Bouscal et al.

(10) Patent No.: US 7,326,478 B2
(45) Date of Patent: Feb. 5, 2008

(54) CEMENT BINDER BASED PLATE

(75) Inventors: Patrice Bouscal, Saint Maur des Fosses (FR); Frédéric Chantereau, Courbevoie (FR); Pierre Colombet, deceased, late of Longnes (FR); by Adrien Colombet, legal representative, Nantes (FR); Christian Derusco, Acheres (FR); Bruno Le Rolland, Oinville sur Montcient (FR); Gilbert Noworyta, Breuil bois Robert (FR)

(73) Assignee: BPB PLC, Slough (GB)

( * ) Notice: Subject to any disclaimer, the term of this patent is extended or adjusted under 35 U.S.C. 154(b) by 282 days.

(21) Appl. No.: 10/479,786

(22) PCT Filed: Jun. 6, 2002

(86) PCT No.: PCT/FR02/01928

§ 371 (c)(1),
(2), (4) Date: Jul. 14, 2004

(87) PCT Pub. No.: WO02/098815

PCT Pub. Date: Dec. 12, 2002

(65) Prior Publication Data

US 2005/0014034 A1    Jan. 20, 2005

(30) Foreign Application Priority Data

Jun. 7, 2001    (FR) .................................. 01 07462

(51) Int. Cl.
*B32B 9/04* (2006.01)

(52) U.S. Cl. ...................... 428/703; 428/704; 106/692; 106/695; 106/724; 106/726; 106/735; 106/736

(58) Field of Classification Search ................ 106/713, 106/692, 695, 724, 726, 735, 736; 428/703, 428/704
See application file for complete search history.

(56) References Cited

U.S. PATENT DOCUMENTS

| 4,286,992 A | 9/1981 | Galer et al. |
| 4,957,556 A | 9/1990 | Kunbargi |
| 5,114,487 A * | 5/1992 | Gartshore et al. .......... 106/695 |
| 6,695,910 B2 * | 2/2004 | Classen et al. ............. 106/739 |
| 2001/0000738 A1 | 5/2001 | Mathieu |

FOREIGN PATENT DOCUMENTS

| EP | 0 353 062 | 1/1990 |
| EP | 0 439 372 | 7/1991 |
| FR | 2 350 313 | 12/1977 |

OTHER PUBLICATIONS

Chemical Abstracts, vol. 104, No. 24, Jun. 16, 1986 Columbus, Ohio, US; abstract No. 212159z, I. Takada: "Mortar compositions" XP000125102.
Patent Abstracts of Japan vol. 014, No. 039 (M-924), Jan. 24, 1990.
Patent Abstracts of Japan vol. 014, No. 068 (C-0686), Feb. 8, 1990.

* cited by examiner

*Primary Examiner*—Paul Marcantoni
(74) *Attorney, Agent, or Firm*—Young & Thompson (57) ABSTRACT

The invention concerns a plate whereof the body comprises a binder containing Portland cement, a sulphoaluminous clinker and a calcium sulphate source: the binder comprises, by weight 30 to 80% of Portland cement, 20 to 70% of sulphoaluminous binder, 5 to 20% of a calcium sulphate source, and 0.4 to 7% of a water-reducing plasticizer or highly waterreducing superplasticizer admixture; it contains light aggregates in an amount such that the final density is close to 1, of the order of 0.8 to 1.5.

33 Claims, 5 Drawing Sheets

CEMENT BINDER BASED PLATE

The present invention relates to boards based on a cementitious binder.

In the present context, the term "board" means a thin and globally flat product whose height is small compared to the other two dimensions, whether the cross section is rectilinear or not, for example crenellated, sinusoidal, such as a corrugated sheet, or otherwise.

Preparing light mortars based on cement, comprising a binder and a light aggregate, as well as inert aggregates, setting regulators and fluidizers, is known in the art.

The document EP-A-181739 describes one composition of such mortars in which the binder is produced by mixing a sulfoaluminous clinker that is free of silicates and an alkaline or alkaline earth "salt" in a basic medium. The "salt" is an aqueous suspension containing calcium sulfate, lime, bentonite and a hardening accelerator. The sulfoaluminous clinker is also in the form of an aqueous suspension. In both cases, the water/solids ratio used is equal to 2.5. This yields cement matrices of mediocre mechanical performance.

The document EP-A-353062 proposes a formulation obtained by mixing sulfoaluminous clinker, a source of lime (lime, Portland cement) and fibers (organic or wollastonite), for fabricating thin (15 mm thick) and lightweight (specific gravity less than 1) board. However, a large quantity of water is used, and the mechanical strengths at 24 hours are very low. The document WO 94/29232 describes a composition based on calcium sulfoaluminate $C_4A_3\bar{S}$ (10-30%), Portland cement (50-80%), anhydrite (5 to 20%) and light aggregates to produce lightweight panels. Although the products obtained have a low specific gravity (of the order of 0.6), mechanical performance at 24 hours remains mediocre.

The objective of the present invention is to propose a composition, and therefore a board, combining a good compromise between mechanical performance and specific gravity, close to 1, of the order of 0.8 to 1.5, with a good compromise between initial workability, rate of setting and rate of hardening.

The object of the invention is therefore to propose a composition, and therefore a board, based on a cementitious binder, requiring only very little water, setting quickly, in less than 10 or 20 minutes, and hardening rapidly to a high hardness, that is to say, for example, with mechanical properties of resistance to compression at 48 hours of $R_c > 5$ MPa. Said composition must furthermore have a sufficient handling or working time for the mortar to be used before it sets.

The above object is achieved by a composition for fabricating boards or panels based on a cementitious binder and intended to have water added to it, the binder containing, by weight:

- 30 to 80% Portland cement,
- 20 to 70% sulfoaluminous clinker,
- 5 to 20% of a source of calcium sulfate, and
- 0.4 to 7% or preferably 0.5 to 7% of at least one water reducer plasticizing additive or high water reducer superplasticizing additive.

The sulfoaluminous clinker preferably contains more than approximately 30% of $C_4A_3\bar{S}$.

Water is preferably added to the composition in an approximate water/binder ratio by weight from 0.2 to 0.5. Advantageous additives include those containing polymelamine sulfonate or a poly(meth)acrylate.

The composition advantageously contains up to approximately 2% of a second additive in the form of a retarder. The second additive contains a poly(meth)acrylate or a gluconate or citric acid.

Surprisingly, the use of the combination of these two types of additive, namely a polymelamine sulfonate and a second additive in the form of a poly(meth)acrylate or gluconate or citric acid:

because of the former, achieves a high fluidity during use without increasing the setting time, and because of the latter, delays setting (to increase the time for which the mortar can be used) and improves rheological behavior.

Furthermore, varying the relative proportions of the two types of additive previously cited provides a means of controlling the time of use of said composition without compromising the initial workability or the rate of hardening.

Preferred poly(meth)acrylates for the composition according to the invention are the fluidizers based on acrylates described in patent application FR-0 013 117 filed 13 Oct. 2000, and in particular Cimfluid 2000 AC (from Ciments Français), which includes a poly(ethylene oxide) of low mass and a copolymer of sodium methacrylate and poly(ethylene oxide) methacrylate.

The source of calcium sulfate can be chosen from plaster, gypsum or anhydrite, plaster being preferred. The contribution of sulfate by the source of calcium sulfate is preferably such that the mass ratio r is from 2 to 2.5, where the mass ratio r is defined by the following equation:

$$r = [(SO_3)_a + (SO_3)_b]/(SO_3)_c$$

in which:

$(SO_3)_a$ is the content of sulfate coming from the source of calcium sulfate, $(SO_3)_b$ is the content of free sulfate coming from the sulfoaluminous clinker, and $(SO_3)_c$ is the content of sulfate coming from the calcium sulfoaluminate contained in the sulfoaluminous clinker.

The Portland cement content of the board body according to the invention can advantageously be from 50 to 70% by weight of the binder.

It is preferable if the Portland cement has an approximate Blaine specific surface area from 2500 to 6000 cm²/g and if the approximate Blaine specific surface area of the sulfoaluminous clinker is from 2500 to 7000 cm²/g. Within the above specific surface area ranges, the hydration kinetics of the binder are not significantly modified.

The composition of the board body according to the invention can further contain an alkaline carbonate additive as a hardening accelerator, lithium carbonate ($Li_2CO_3$) being preferred.

When the above composition is mixed with light aggregates or foam, a board body is obtained that has a specific gravity close to 1 combined with good performance in terms of mechanical resistance to compression and to flexing.

The light aggregates, such as polystyrene balls, are in proportions such that the final specific gravity is close to 1, of the order of 0.8 to 1.5. The light aggregates preferably have a size less than or equal to 4 mm, or even less than or equal to 1 mm. They are advantageously expanded polystyrene balls, but may also be natural minerals, such as sand, or expandable natural materials, whether expanded or not.

The board body according to the invention can contain a foam, for example obtained from a foaming agent; it can also enclose an agent for entraining air.

The foaming agent or the air entraining agent advantageously contains a surfactant compatible with a pH from 10 to 14. The surfactant is a compound based on fatty acid salts or sulfonate alkyls or vinsol resin, for example.

One method of fabricating from a composition of the above kind lightweight boards or panels having appreciable mechanical strength in the short term despite their low specific gravity can consist in:

a) mixing a composition intended to form the body of the board with water in an approximate water/binder ratio by weight from 0.2 to 0.5 or preferably from 0.25 to 0.40; and b) depositing the mixture in a mold.

Alternatively, the method comprises the following steps:

a) mixing a composition intended to form the body of the board with water in an approximate water/binder ratio by weight from 0.2 to 0.5 or preferably from 0.25 to 0.40;

b) depositing the mixture on a moving support, which is driven continuously by a conveyor belt, said mixture passing under a forming roller to form a board; and c) cutting the board obtained at least to length.

Another variant of the method comprises the following steps:

a) mixing the composition with water in an approximate water/binder ratio by weight from 0.2 to 0.5 or preferably from 0.25 to 0.40;

b) depositing the mixture on a moving support, which is driven continuously by a conveyor belt, said mixture passing through an extruder to form a board; and c) cutting the board obtained at least to length.

The main advantage of the latter method is that it can be carried out continuously, thanks to the composition having a high initial workability, a limited setting time, and rapid hardening, authorizing immediate manipulation of the boards at the end of the setting period. The method can therefore produce a large number of boards in a limited time period. The production costs of such boards are significantly reduced.

In step a) of the method, the water is preferably added in an approximate water/binder ratio by weight from 0.25 to 0.40.

Methods of the above kind produce boards or panels based on cementitious binder with a specific gravity of close to 1, of the order of 0.8 to 1.5.

In step b), the mixture can also be deposited on a so-called bottom facing, which considerably increases the resistance to flexing of the board.

In step c), the cutting process is advantageously water jet cutting, which produces clean and sharp cut.

The board advantageously carries a facing in the form of a mesh or skreed on one of its faces, and preferably on each of its faces; the mesh is made up of glass fibers; the mesh is associated with a web; the web is a mat, preferably of glass fibers.

Boards fabricated in the above manner are also resistant to inclement weather and salt mist. They are therefore particularly suitable for use in the construction sector, to form or cover walls, floors or roofs, inside or outside buildings, and in particular in very wet atmospheres or areas that are frequently washed with a water jet, such as industrial kitchens, agriculture-foodstuffs laboratories, showers and bathrooms, pools, swimming pools, the rooms of agricultural buildings or industrial slaughterhouses.

Boards of the above kind can also be used to form or cover walls, floors or roofs exposed to salt mist.

Boards of the above kind advantageously have a thin densified region.

An extruder for implementing methods of the above kind is of the kind including a transverse extrusion die, at least part of which die is subjected to vibrations.

To this end, the die has a top lip and a bottom lip which advantageously carries at least one vibrator, preferably two vibrators, on its bottom face; the axis of the or each vibrator can be oriented horizontally and/or vertically; the distance between the top and bottom lips of the die is adjustable; the top and bottom lips are the blades of an extruder or the rollers of a forming roller.

The extrusion die is advantageously generally rectangular with the ends of the facing lengths converging slightly; two of the parallel lateral edges of a board obtained from this kind of extruder are then slightly thinner.

The present invention will be explained in more detail with the aid of the following illustrative but nonlimiting examples, which refer to the drawings, in which.

The binder of the board body comprises a mixture of Portland cement, sulfoaluminous clinker and a source of calcium sulfate (anhydrite, plaster or gypsum)

The expression "Portland cement" means a cement of type I, II, III, IV or V as standardized under European standard EN 197-1. Examples of such cements are ordinary Portland cement and any other cement with additives (composite Portland, pozzolanic, blast furnace, slag or ash cement).

The above examples of cements have approximate Blaine specific surface areas from 3700 $cm^2/g$ to 5050 $cm^2/g$.

The Portland cement content of the binder can vary from 30 to 80%. Throughout this range, it is possible to obtain quick setting formulations (setting time less than 20 minutes). A preferred range is from 50 to 70%, which yields optimum mechanical performance.

The expression "sulfoaluminous clinker" means any material resulting from the curing at a temperature from 900° C. to 1450° C. (this process is known as "clinkerization") of mixtures containing at least one source of lime (for example limestone, which has a CaO content varying from 50% to 60%), at least one source of alumina (for example bauxites or other fabrication byproducts containing alumina), and at least one source of sulfate (gypsum, chemical gypsums, plaster, natural or synthetic anhydrite, sulfocalcic ash). The sulfoaluminous clinker used in the present invention contains more than 30% of $4CaO.3Al_2O_3.SO_3$ (also denoted $C_4A_3\bar{S}$). The basic analyses and the main constituents of two usable types of sulfoaluminous clinker, characterized by respective contents of $C_4A_3\bar{S}$ greater than 47%, are set out in tables I and II below:

TABLE I

| OXIDE | CLINKER 1 | CLINKER 2 |
|---|---|---|
| $SiO_2$ | 3.6% | 7.6% |
| $Al_2O_3$ | 45.3% | 27.9% |
| $Fe_2O_3$ | 0.9% | 7.0% |
| CaO | 37.0% | 45.1% |
| $SO_3$ | 7.8% | 7.9% |
| $TiO_2$ | 2.6% | 2.2% |
| Other | 2.8% | 2.3% |

TABLE II

| CONSTITUENT | CLINKER 1 | CLINKER 2 |
|---|---|---|
| $C_4A_3\bar{S}$ | 60% | 47% |
| CA, $CA_2$, $C_{12}A_7$ | 14% | — |
| $C_2S$ | — | 22% |
| $C_2AS$ | 17% | — |
| $C\bar{S}$ | — | 3% |
| $C_4AF$ | 3% | 22% |
| CT | 4% | 4% |
| Other | 2% | 2% |

The presence of up to 10% of free lime CaO in the sulfoaluminous clinker can be tolerated without compromising the usage properties of the binder employed in the context of the present invention. This can arise, for example, if the clinker is obtained by curing at relatively low temperature.

The content of sulfoaluminous clinker in the binder can vary from 20% to 70%.

If the Blaine specific surface area of the sulfoaluminous clinker is from 2500 cm$^2$/g to 7000 cm$^2$/g, and in particular from 3500 to 6500 cm$^2$/g, the hydration kinetics of the binder are not significantly modified, and achieve rapid setting and hardening.

The sulfate source can be chosen at will from gypsum (or chemical gypsums), plaster, natural or synthetic anhydrite or sulfocalcic ash. The content of $SO_3$ coming from the sulfate source can be up to 10% by mass of the total binder (which corresponds, for example, to a plaster content of up to 20% relative to the total binder). A preferred composition is one such that the contribution of sulfate is such that the mass ratio r defined above is close to 2. It is precisely in this case that the stoichiometric conditions of formation of ettringite are complied with:

$C_4A_3\bar{S} + 2\,C\bar{S}H_{0.5} + 37H \rightarrow C_6A\bar{S}_3H_{32} + 2AH_3$ This preferred composition guarantees increased durability of the boards. In fact, the absence of sulfate leads to the formation of calcium monosulfoaluminate $C_4A\bar{S}H_x$ that is unstable vis à vis sulfated water, for example, leading a posteriori to the formation of expansive ettringite. On the other hand, an excess of sulfate can lead to instability of thin products vis à vis moisture.

If the priority is very short term mechanical strength, the preferred sulfate of the invention is plaster. If the priority is plasticity, the preferred sulfate is anhydrite.

In relation to the composition of the binder with additives, the term "(super)plasticizer" must be understood to include any organic compound capable of improving the usability (or workability) of light mortar. In the case of the present invention, it can also achieve a significant water reduction, for the same workability, and this contributes to obtaining higher mechanical performance for the production of lightweight boards.

According to the EN 934-2: 1997 standard, a water reducer additive reduces the quantity of water necessary by at least 5% relative to a cement composition with no additives, and a high water reducer additive reduces the quantity of water necessary by at least 12% relative to a cement composition with no additives.

The (high) water reducer (super)plasticizer additives used can be alkaline (Li, Na, K) salts or alkaline earth (Ca, Mg) salts obtained from combined condensation of β-naphthalene sulfonic acid and formaldehyde (of the Cimfluid 230 or 232 type from Axim, Ciments Français), from combined condensation of sulfonated melamine and formaldehyde (Cimfluid ML type from Axim, Ciments Français) or lignosulfonates.

A preferred additive in the context of the present invention is the alkaline or alkaline earth salt obtained from combined condensation of sulfonated melamine and formaldehyde (Cimfluid ML type), which achieves high fluidity and causes no significant retardation of setting despite the high doses used.

The Cimfluid ML content varies from 0.5 to 7% (percentage by mass relative to the weight of the binder).

Any mineral or organic compound that significantly extends the setting time of a mortar formulation without compromising its rheology is generally considered to constitute a setting retarder. The benefit of this kind of additive lies in the possibility of controlling the setting of the formulation, and where applicable of retarding setting, to facilitate good workability. Preferred retarders are citric acid, gluconates and polyacrylates or polymethacrylates (of the Cimfluid 2000 AC type), which also significantly improve the workability of the paste.

It is obvious that the ideal formulation results from a compromise between the water content, the (high) water reducer (super)plasticizer content, and the retarder content, to obtain the required workability, time of use and mechanical performance. The water/binder ratio by weight used is generally from 0.2 to 0.5. Beyond this range mechanical performance falls off vertiginously. For a water/binder ratio by weight of less than 0.2, there is insufficient water for the reactions constituting hydration of the binder; surplus anhydrite binder can then remain, and can compromise the durability of the material in a damp environment. The water/binder ratio used is preferably from 0.25 to 0.40.

EXAMPLES

Preparation of a Board Body Composition According to the Invention:

The formulation of the base is as follows (composition 1):

| | |
|---|---|
| CPA CEM I 52.5 | 60 g |
| Sulfoaluminous clinker (1) | 30 g |
| Gypsum | 10 g |
| Additive | x g |
| Total water | 30 g |

(including that in the additives)

Performance differences of the above base cement composition on varying the relative proportions x and the nature of the additives were studied, using the compositions of examples 1, 5, 7, 10 and 12 described below.

The following measurements are effected on the above compositions:

Measurement of time of use: The procedure consists in tracking the Theological behavior of the composition as a function of time when undergoing continuous mixing at an imposed speed of 300 rpm. The time of use is then defined as the time at which the measured resisting torque is equal to 0.05 N.m. The calculated parameter $\Delta t_2$ corresponds to the time necessary for the measured resisting torque to increase from 0.05 N.m to 0.1 N.m. It takes account of the rate of hardening of the composition: the shorter this time, the higher the rate of hardening.

Measurement of initial spreading: The procedure consists in effecting a Theological measurement 1 minute 20 seconds after mixing using a Smidth ring with the following dimensions: inside diameter=60 mm, height=50 mm. The paste is mixed for 40 seconds at 250 rpm and the spreading measurement is effected after 1 minute 20 seconds.

Measurement of setting time: The procedure adopted consists in measuring, as a function of time, the resistance to the penetration of a cylindrical needle with a diameter of 3 mm into the formulation under test using the TA XT2 texture meter from Société Rhéo. The rate and distance of penetration are respectively fixed at 2 mm/s and 10 mm depth. The measured start and end of setting times respectively correspond to the times necessary to obtain a force of 10 N and of 50 N at a depth of 10 mm. In contrast to the measurement of the time of use, the measurement of the setting time is effected at rest without disturbing the sample during setting by mixing it. The calculated parameter $\Delta t_1$ corresponds to the time necessary for the measured force to increase from 10 N to 50 N. It takes account of the rate of hardening of the composition: the shorter this time, the higher the rate of hardening.

The various compositions studied are described below:

Example 1

This composition contains only the base formulation and the Cimfluid ML superplasticizer:

| ADDITIVE x (g) ML* | SPREAD (mm) | TIME OF USE (min) | START OF SETTING TIME (min) | END OF SETTING TIME (min) | $\Delta t_1$ (min) | $\Delta t_2$ (min) |
|---|---|---|---|---|---|---|
| 2 | 146 | 6.8 | 14.0 | 21.5 | 7.5 | 2.0 |
| 4 | — | 18.0 | 14.8 | 25.6 | 10.8 | 3.3 |
| 8 | — | 17.0 | 16.5 | 27.0 | 10.5 | 3.6 |

*ML = Cimfluid ML,
(—): not measured

A value of 60 mm corresponds to a zero spread (the diameter of the cone used for the measurement).

The Cimfluid ML superplasticizer used on its own yields satisfactory results.

The following examples 2 to 6 also used the Cimfluid ML superplasticizer on its own.

Example 2

Comparison of Two Uses of a Sulfoaluminous Clinker with Different Contents of Calcium Sulfoaluminate $C_4A_3\bar{S}$ The formulations studied were as follows:

| | COMPOSITION | |
|---|---|---|
| | 2a | 2b |
| CEM I 52.5 | 60 g | 50 g |
| Sulfoaluminous clinker | Type 1 (table I) 30 g | Type 2 (table I) 43 g |
| $C_4A_3\bar{S}$ content of clinker | 56% | 35% |
| Plaster | 10 g | 7 g |
| Additive = Cimfluid ML | 2 g | 2 g |
| Water | 30 g | 30 g |

The start of setting times measured for the compositions 2a and 2b are 6 minutes and 7 minutes 50 seconds, respectively. The composition 2a has a ratio r equal to 2.48.

Example 3

This example shows the effects on the start and end of setting times of the Portland cement content of the binder, with a plaster content maintained constant and equal to 10%, the remainder to 100% being sulfoaluminous clinker. These tests are carried out in the presence of 2% Cimfluid ML and in the absence of lightweight aggregates, the water/binder mass ratio being 0.30.

The following table shows that for Portland cement contents from 36 to 76% the start of setting time is 10 minutes or less.

| AMOUNT OF PORTLAND CEMENT IN BINDER (%) | START OF SETTING TIME (min) | END OF SETTING TIME (min) |
|---|---|---|
| 36 | 10 | 13 |
| 54 | 6 | 8 |
| 60 | 6 | 8 |
| 68 | 7 | 9 |
| 76 | 8 | 10 |

Example 4

2 g of expanded polystyrene balls were added to composition 2a of example 2.

The measurements of setting times and of mechanical resistance to flexing (Rf) and compression (Rc) were carried out on (4×4×16) cm³ samples with a specific gravity equal to 1, after 20 minutes, 60 minutes and 24 hours. The values obtained are set out in the table below:

| MEASUREMENT | VALUE |
|---|---|
| SPECIFIC GRAVITY (at 20 min) | 1 |
| Rf (at 20 min) | 0.9 MPa |
| Rc (at 20 min) | 2.50 MPa |

-continued

| MEASUREMENT | VALUE |
|---|---|
| Rf (at 60 min) | 1.20 MPa |
| Rc (at 60 min) | 3.40 MPa |
| Rf (at 24 hours) | 1.80 MPa |
| Rc (at 24 hours) | 8.80 MPa |

Example 5

Mechanical resistance to flexing (Rf) and compression (RcD) were measured on (4×4×16) cm$^3$ samples after 24 hours with a formulation identical to that of example 4, but with the Portland cement content varying. The results are set out in the table below:

| PORTLAND CEMENT CONTENT (%) | SPECIFIC GRAVITY | 24 hours Rf (MPa) | 24 hours Rc (MPa) |
|---|---|---|---|
| 47 | 0.98 | 1.6 | 10.2 |
| 60 | 1.00 | 1.8 | 8.8 |
| 63 | 1.01 | 2.1 | 9.0 |
| 66 | 0.99 | 1.7 | 8.3 |
| 68 | 0.99 | 1.7 | 8.3 |

Example 6

Use of Portland cement and sulfoaluminous clinker with different Blaine specific surface areas.

The formulation studied in all cases is the previous composition 2a to which polystyrene balls were added to obtain a specific gravity very close to 1. The influence of the Blaine specific surface area of the Portland cement and that of the sulfoaluminous clinker on the very short term mechanical performance were studied.

| Portland cement CEM I (*) | Blaine specific surface area (cm$^2$/g) | Specific gravity | t = 20 minutes Flexing Rf (MPa) | t = 20 minutes Compression Rc (MPa) | t = 24 hours Flexing Rf (MPa) | t = 24 hours Compression Rc (MPa) |
|---|---|---|---|---|---|---|
| 6a | 3720 | 0.95 | 1.0 | 3.1 | 1.9 | 8.7 |
| 6b | 4050 | 1.01 | 0.9 | 3.5 | 1.9 | 8.4 |
| 6c | 4420 | 0.95 | 0.9 | 3.2 | 1.9 | 7.4 |
| 6d | 5040 | 1.01 | 0.9 | 3.5 | 1.8 | 7.0 |

(*): the specific surface area of the sulfoaluminous clinker used is equal to 4500 cm$^2$/g

| Sulfo-aluminous cement (**) | Blaine specific surface area (cm$^2$/g) | Specific gravity | t = 20 minutes Flexing Rf (MPa) | t = 20 minutes Compression Rc (MPa) | t = 24 hours Flexing Rf (MPa) | t = 24 hours Compression Rc (MPa) |
|---|---|---|---|---|---|---|
| 6e | 3800 | 0.95 | 1.1 | 3.1 | 1.9 | 8.7 |
| 6f | 4500 | 1.02 | 1.2 | 2.9 | 1.9 | 9.8 |
| 6g | 5000 | 0.98 | 0.9 | 3.2 | 2.0 | 9.7 |

(**): the specific surface area of the sulfoaluminous clinker used is equal to 3720 cm$^2$/g In the specific surface area range studied (3500-5500 cm$^2$/g), whether in the case of sulfoaluminous clinker or Portland cement, the hydration kinetics of the composition 2a are not significantly modified, as indicated by the similar mechanical performance obtained.

Example 7

The two additives, i.e. the superplasticizer (Cimfluid ML) and the poly(meth)acrylate retarder (Cimfluid AC) are used simultaneously in the cement base composition at contents set out in the table below:

| ADDITIVE x (g) ML* | ADDITIVE x (g) AC* | SPREAD (mm) | TIME OF USE (min) | START OF SETTING TIME (min) | END OF SETTING TIME (min) | $\Delta t_1$ (min) | $\Delta t_2$ (min) |
|---|---|---|---|---|---|---|---|
| 2 | 0.3 | 156 | 16.5 | — | — | — | 2.1 |
| 2 | 0.6 | 202 | 26.3 | — | — | — | 2.2 |
| 2 | 1 | 217 | 32.2 | 14.2 | 25.5 | 11.3 | 2.2 |

*ML = Cimfluid ML,
*AC = Cimfluid 2000 AC

The use of 2% of Cimfluid ML obtains a rapid setting and rapid hardening cement formulation usable in the context of fabrication of thin lightweight cement-based products.

The use of Cimfluid 2000 AC, at contents of up to 1% in this example, controls the time of use of the basic composition (containing 2% of Cimfluid ML), which can be up to approximately 30 minutes. Moreover, this addition increases the initial workability of the composition without significantly modifying the start and end of setting times. The values of $\Delta t_1$ and $\Delta t_2$ show that, even with 1% of Cimfluid 2000 AC, the rate of hardening is only slightly lower.

Example 8

With a formulation identical to that of the composition of example 4, with a content of polymelamine sulfonate equal to 2%, and adding 1% of poly(meth)acrylate, the resistance to flexing (Rf) was measured at 1 hour 30 minutes and 24 hours directly on thin boards fabricated in accordance with the invention, with dimensions L=100 mm, l=75 mm, e=12.5 mm, from compositions in which only the content of Portland cement varies. Expanded polystyrene balls with a particle size range ≦1 mm were added to the binder at the rate of 2% by mass. The results are set out in the table below:

| AMOUNT OF PORTLAND CEMENT IN BINDER (%) | SPECIFIC GRAVITY | Rf AT 1 HOUR 30 MINUTES (MPa) | Rf AT 24 HOURS (MPa) |
|---|---|---|---|
| 60 | 1.05 | 1.46 | 1.70 |
| 64 | 1.07 | 2.10 | 2.26 |
| 67 | 1.02 | 1.30 | 1.61 |
| 69 | 1.07 | 1.37 | 1.79 |

As can be seen, the resistances to flexing are significant from as little as 1 hour 30 minutes.

Examples 9 and 9a:

These examples compare the mechanical performance in compression (Rc) and flexing (Rf) of two compositions 9a and 9 respectively prepared in the presence and in the absence of $Li_2CO_3$.

The formulations are as follows:

| binder (100%) | |
|---|---|
| sulfoaluminous clinker 1 | 45% |
| Portland cement CEM I 52.5 | 40% |
| Plaster | 15% |
| additives (% relative to binder) | |
| Cimfluid ML | 1.5% |
| Cimfluid AC 2000 | 0.3% |
| polystyrene balls (≦1 mm) | 1.5% |
| $Li_2CO_3$ | 0% (ex. 9) |
| | 0.5% (ex. 9a) |
| water 30% relative to binder | |

The performance obtained is set out in the following table:

| MEASUREMENT | EXAMPLE 9 WITHOUT $Li_2CO_3$ | EXAMPLE 9A WITH $Li_2CO_3$ |
|---|---|---|
| SPECIFIC GRAVITY (at 20 min) | 9.98 | 1.00 |
| SETTING TIME | <8 min | <8 min |
| Rf (at 20 min) | 1.04 MPa | 1.7 MPa |
| Rc (at 20 min) | 3.3 MPa | 5.8 MPa |
| Rf (at 24 hours) | 1.6 MPa | 1.9 MPa |
| Rc (at 24 hours) | 10.2 MPa | 12.6 MPa |

Example 10

Polymelamine sulfonate (Cimfluid ML) at a rate of 2% and citric acid at varying rates were added to the cement base composition. The results obtained are set out below:

| ADDITIVE x (g) | | SPREAD (mm) | TIME OF USE (min) | START OF SETTING TIME (min) | END OF SETTING TIME (min) | $\Delta t_1$ (min) | $\Delta t_2$ (min) |
|---|---|---|---|---|---|---|---|
| ML* | citric acid | | | | | | |
| 2 | 0.4 | 78 | 14.3 | 17.6 | 26.5 | 8.9 | 2.6 |
| 2 | 1 | 65 | 20.3 | 21.8 | 34.4 | 12.6 | 3.0 |
| 2 | 1.5 | 64 | 50.5 | — | — | — | 22.8 |

*ML = Cimfluid ML

The use of citric acid increases the time of use of the composition.

Example 11

In the composition of example 1, the poly(meth)acrylate was replaced by an additive containing a gluconate (Cimaxtard 101, from Axim), in the following proportions:

| ADDITIVE X (g) | | SPREAD (mm) | TIME OF USE (min) | $\Delta t_2$ (min) |
|---|---|---|---|---|
| ML* | Cimaxtard 101 | | | |
| 2 | 0.25 | — | 8.5 | 2.0 |
| 2 | 0.50 | — | 13.0 | 2.0 |
| 2 | 1.00 | 120 | 22.0 | 3.5 |
| 2 | 1.5 | — | 23.5 | 4.0 |

*ML = Cimfluid ML

The use of Cimaxtard 101 increases the time of use of the composition without compromising the initial rheology.

Example 12

Poly(meth)acrylate (Cimfluid AC) alone was added to the cement base composition, in the proportions indicated below:

| ADDITIVE x (g) AC* | SPREAD (mm) | TIME OF USE (min) | START OF SETTING TIME (min) | END OF SETTING TIME (min) | $\Delta t_1$ (min) | $\Delta t_2$ (min) |
|---|---|---|---|---|---|---|
| 0.6 | 82 | 7.0 | 7.5 | 14.2 | 6.7 | 1.1 |
| 1 | 186 | 14.4 | 13.5 | 25.5 | 12.0 | 2.0 |
| 2 | 234 | 28.6 | 23.0 | 39.5 | 16.5 | 2.9 |

*AC = Cimfluid 2000 AC

The use of Cimfluid 2000 AC on its own also extends the time of use of the composition, up to approximately 30 minutes. However, note that in the situation where it is possible to obtain a time of use of 28.6 minutes, the value of $\Delta t_1$ is higher than that measured with the mixture [ML(2%)–AC (1%)] (see example 7).

Figure 1:
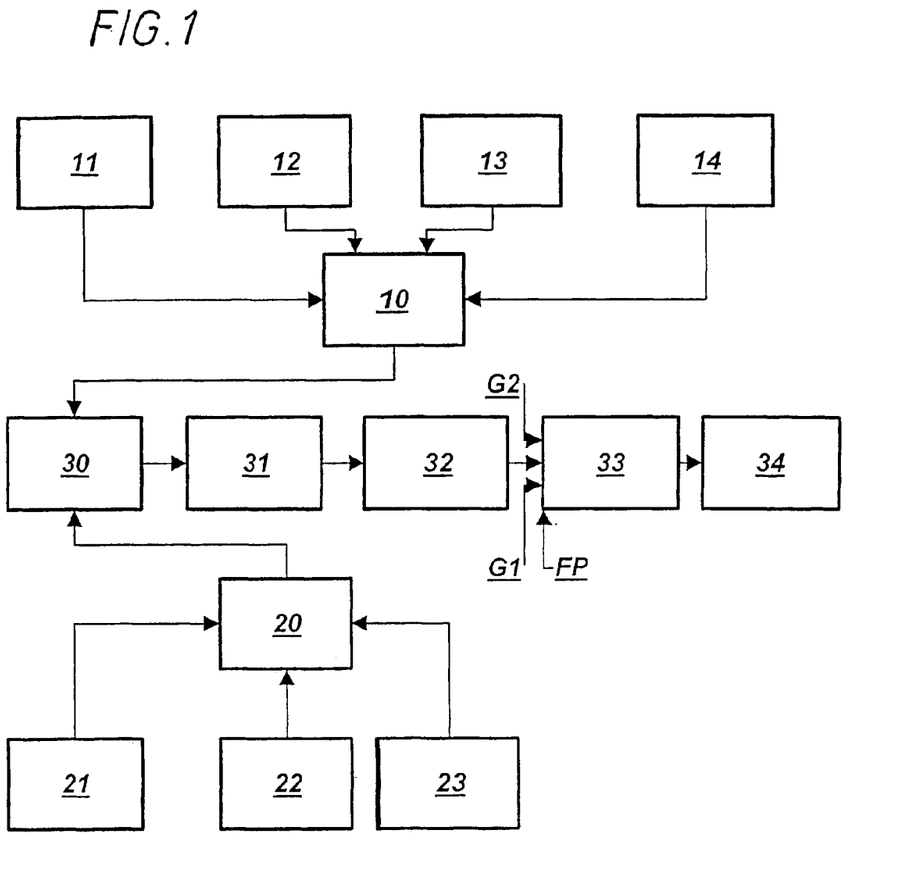
FIG. 1 is a diagram representing a method.

FIG. 1 is a diagram illustrating one fabrication method.

A first metered premixture 10 is produced from cement 11, clinker 12, plaster 13 and aggregates 14 such as polystyrene balls.

A second metered premixture 20 is produced from a plasticizer 21 and a retarder 23 to both of which water 22 has been added.

The premixtures 10 and 20 are introduced into a mixer 30; the resulting mixture is taken up by an uptake pump 31 and distributed via a distributor 32 to the entry of an extruder 33; distribution is effected, homogeneously in the transverse direction, between top and bottom facings consisting of sheets in the form of meshes, namely a bottom mesh G1 and a top mesh G2; the bottom mesh G1 rests on a plastics material sheet FP, such as a polyethylene sheet, pulled by a downstream conveyor belt 43 (FIGS. 2 and 3) and sliding on a table 46 disposed on the upstream side of the extruder 33; at the exit from the extruder 33, the board formed to shape in this way is fed to a cutting station 34 where its length and its edges, and thus its width, are cut, advantageously by a water jet.

During the above process, each facing consists of a mesh G1, G2 and/or a web V, VB; the web V covers the mesh G1, G2 over the whole of its width; the web VB is in strip form and covers only the lateral edges of the mesh G2; the lateral edges of the boards are preferably formed by turning over the bottom mesh G1 and then cut straight; the turned over portion of the bottom mesh G1 is covered by the top mesh G2, whether or not associated with a web V; the turned over portion of the bottom mesh G1 covers the top mesh G2, whether or not associated with a web V; the lateral edges of the bottom mesh G1 are associated with a web V, VB.

The cutting is advantageously effected in the overlapping portion.

Figure 2:
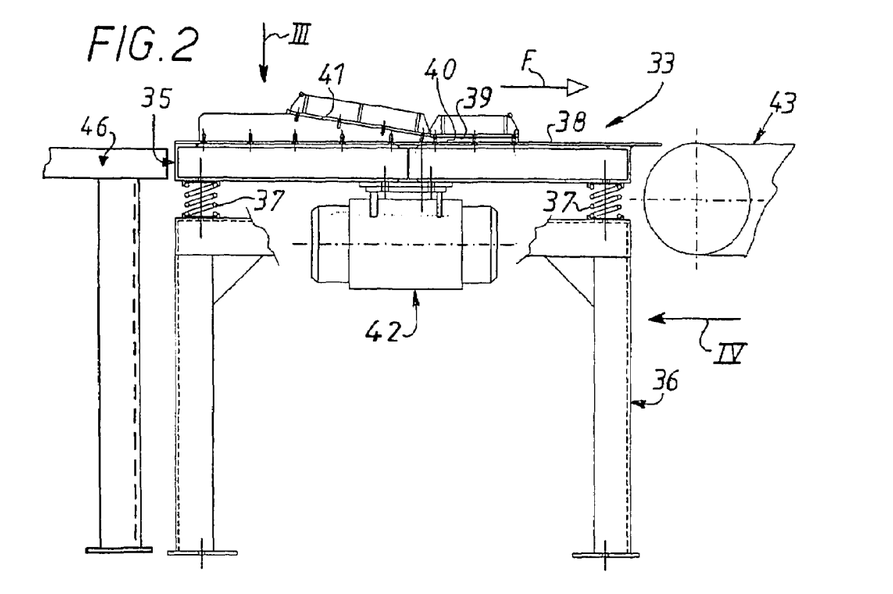
FIGS. 2 to 4 show an extruder used in the above method, FIG. 2 being a view in elevation and FIGS. 3 and 4 being views in the direction of the arrows III and IV in FIG. 2, respectively.
Figure 3:
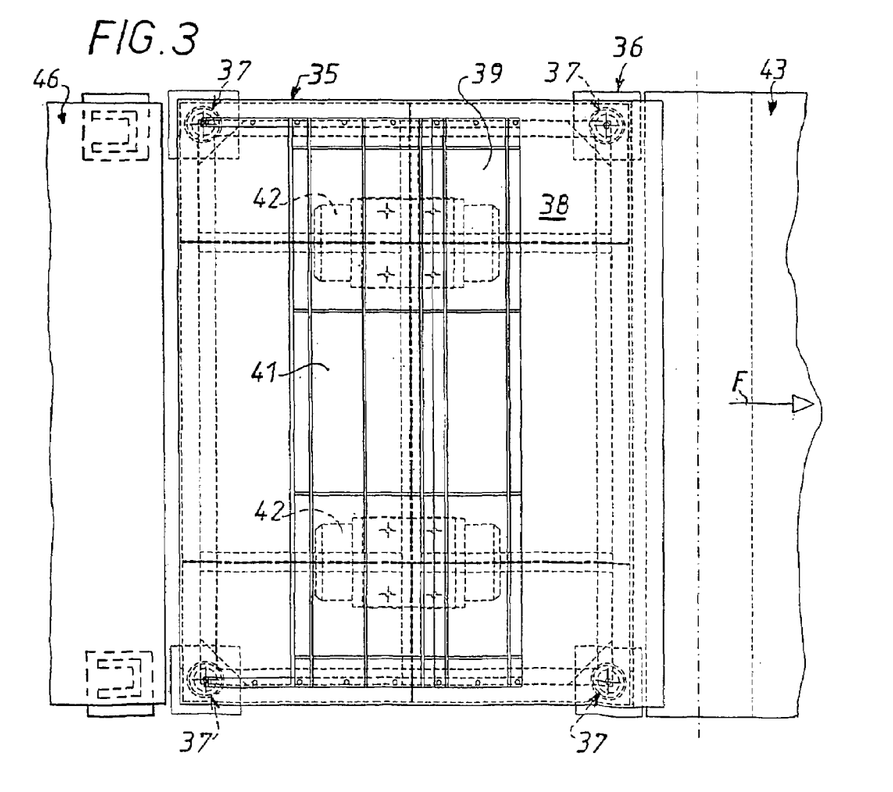
Figure 4:
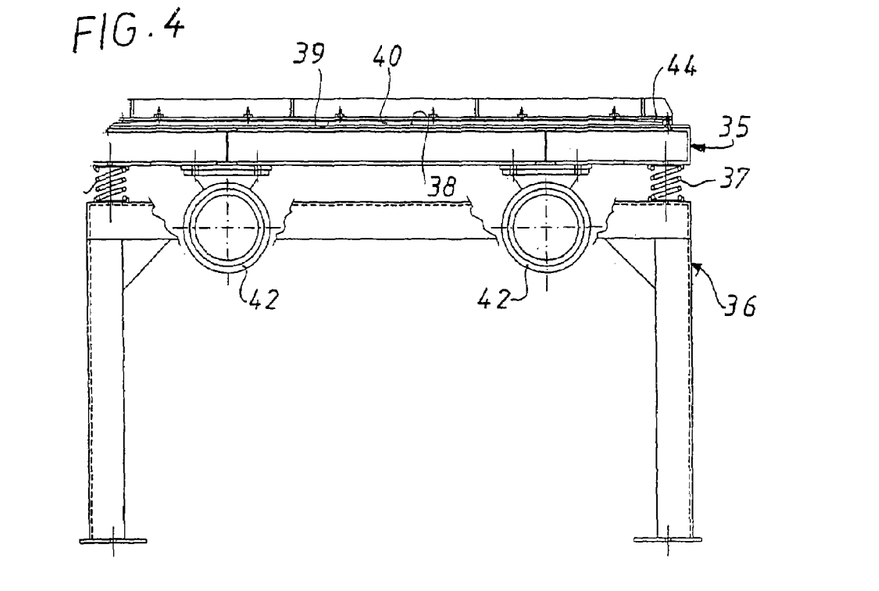

Part of the extruder 33 is shown diagrammatically in FIGS. 2 to 4. It essentially consists of a table 35 elastically mounted on a frame 36 by means of springs 37, here four coil springs disposed at the four corners of the generally rectangular table 35. The top 38 of the table 35 constitutes the bottom lip of a die 40 disposed transversely and of globally rectangular section, the top lip 39 of which is shown; here the top lip 39 is in the form of a blade and its height is adjustable relative to the bottom lip 38 so that the height of the die 40, and therefore the required thickness of the board, can be adjusted.

A slightly inclined deflector 41 at the entry of the die 40 guides the material toward the die.

The bottom of the table 35 carries at least one vibrator 42, here two vibrators 42. A vibrator 42 consists of an electric motor whose rotor has an adjustable counterweight adapted to produce vibrations, for example.

A continuous board pulled by the conveyor belt 43 is obtained at the exit from the extruder 33, as shown by the arrow F in FIGS. 2 and 3.

Figure 5:
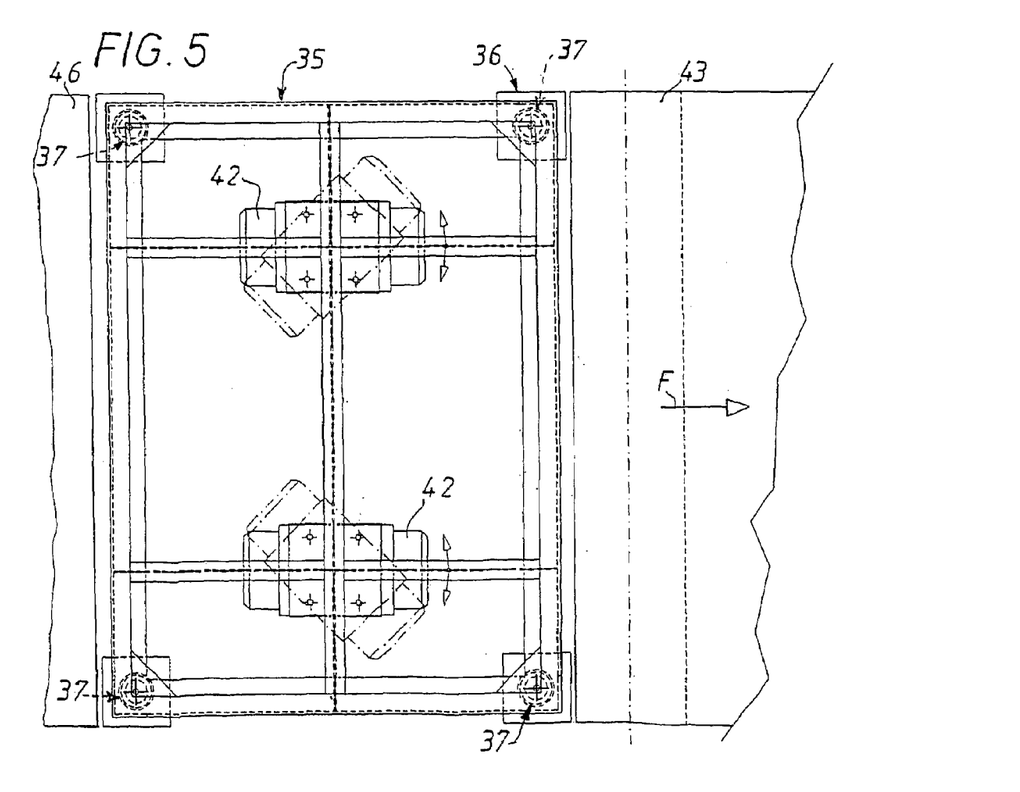
FIG. 5 is a view analogous to FIG. 3 and shows a variant.

Here the axes of the vibrators 42 are parallel to the arrow F; this axis can be oriented in a horizontal plane, as shown in FIG. 5, in which another orientation of the vibrators 42 is shown in chain-dotted outline; it can equally be oriented in a vertical plane, for example the plane of FIG. 2; these orientations favorably influence the homogeneity of the composition in the transverse direction on entering the extruder 33.

Here the die 44 is generally rectangular with the ends 44 slightly converging in the outward direction so that the parallel lateral edges of the resulting board are thinner, as defined in French standard NF P72-302: this facilitates the application of a mastic for jointing two boards side by side, but is not mandatory, of course.

The boards are removed from the conveyor after the operation of distributing the mixture and cutting; the composition according to the invention, the speed of the conveyor belt and the length of the system are such that, at this point, the hydration of the boards is such that each board can be handled.

Figure 6:
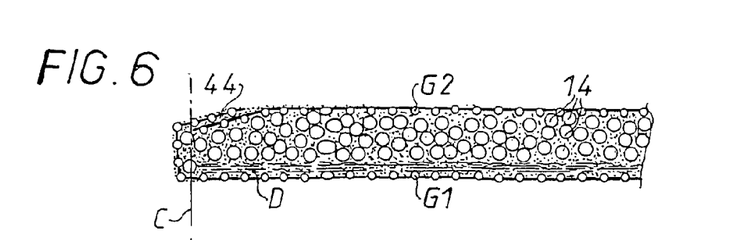
FIG. 6 is a partial sectional view of a board in accordance with the invention before cutting its longitudinal edges.

FIG. 6 shows partly in section a board according to the invention before its edges are cut; there can be seen therein the bottom mesh G1, the top mesh G2, the thinner edge 44 and the aggregates 14; here, to form the edges of the board, the bottom mesh G1 is folded laterally so that it partially overlaps laterally the top mesh G2.

Note that, in the lower portion of the board, as seen in the figure, a thin region D is free of aggregates 14; this is therefore a densified region, obtained by virtue of the nature of the composition of the board body and extrusion with vibration; this region increases the mechanical strength of the board.

As an alternative, the densified region is an applied deposit consisting of a layer free of aggregates.

Figure 7:
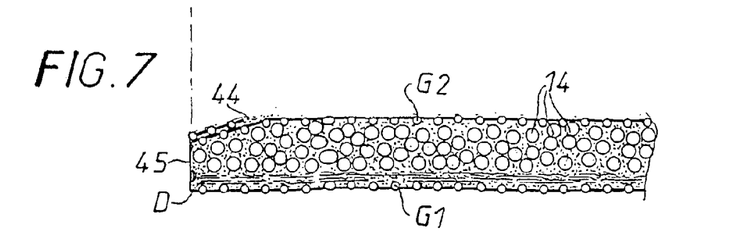
FIG. 7 is a partial sectional view of a board in accordance with the invention after cutting its longitudinal edges along the line C in FIG. 6.

FIG. 7 shows the board after cutting the edge 45 along the line C in FIG. 6.

The parallel lateral edges are straight.

Figure 9:
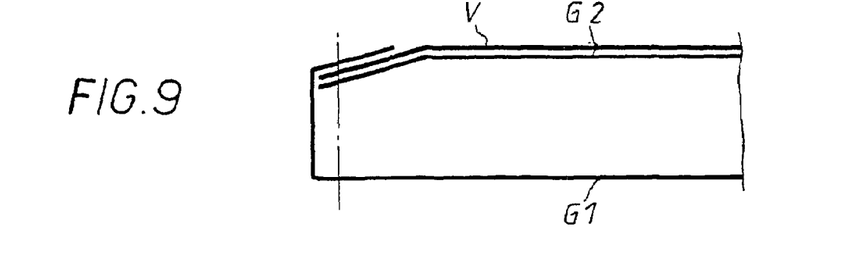

Here also, as shown in FIG. 9, the top mesh G2 can carry, for example have bonded to it, a web V consisting of a glass fiber mat, for example; this kind of web V further increases the mechanical strength of the board; here the web V covers the mesh G2 over the whole of its width.

Other dispositions can be adopted, of course.

Figure 8:
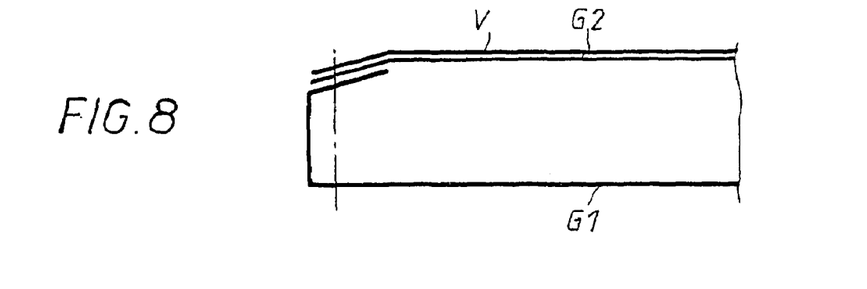
FIGS. 8 to 17 are diagrammatic views analogous to FIG. 6 each showing one variant of a board before cutting its longitudinal edges.
Figure 10:
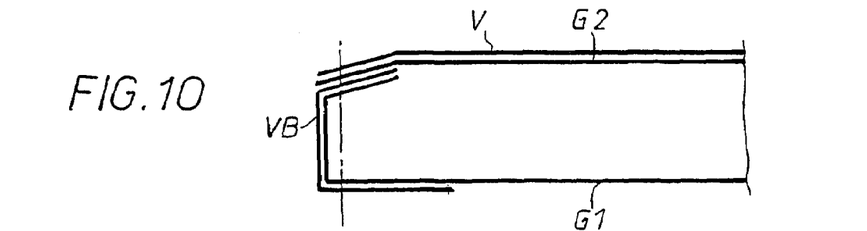
Figure 11:
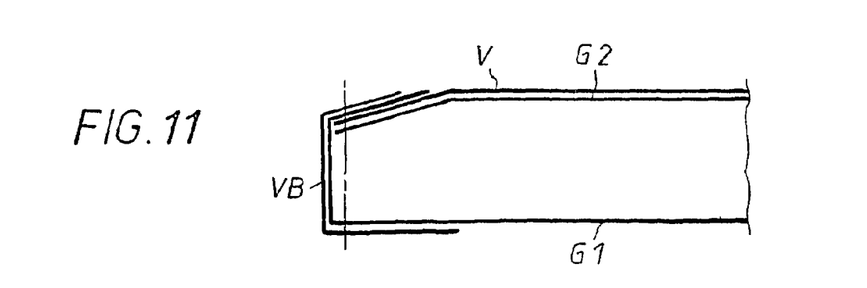
Figure 12:
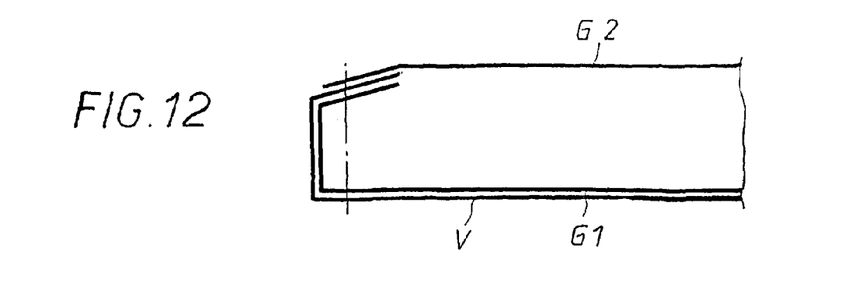
Figure 13:
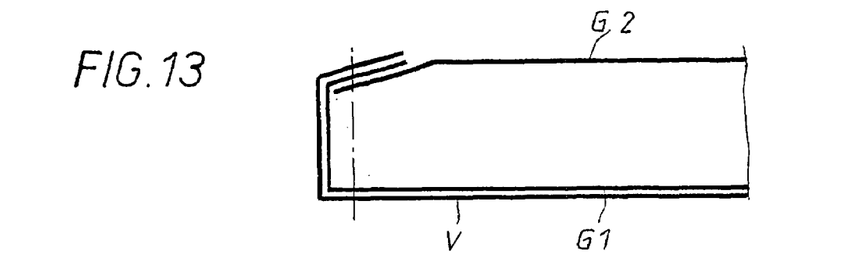
Figure 14:
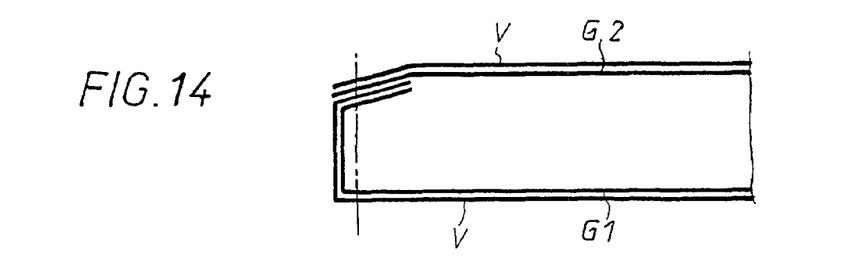
Figure 15:
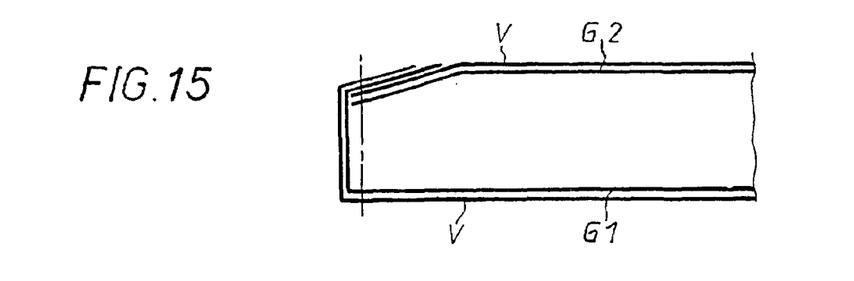
Figure 16:
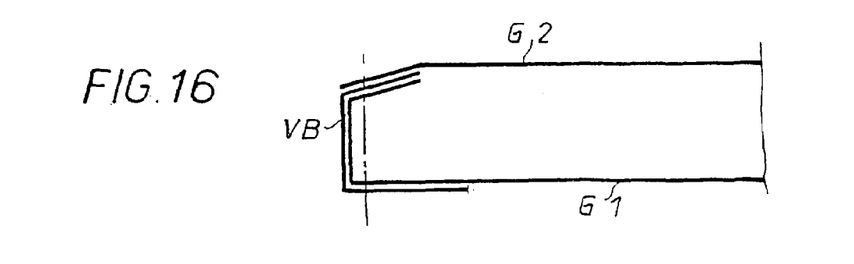
Figure 17:
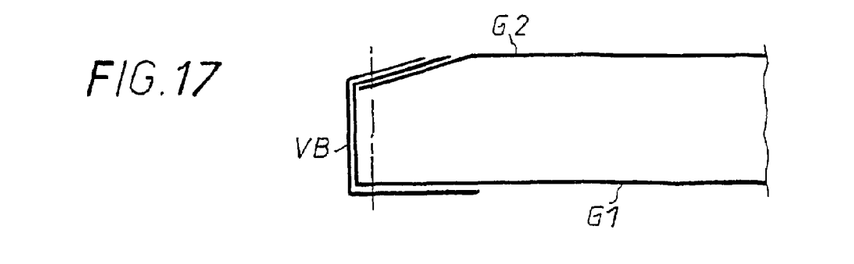

Thus, as shown in FIG. 8, the mesh G2 associated with a web V covers the laterally folded portion of the bottom mesh G1. FIG. 10 is analogous to FIG. 2 except that the bottom mesh G1 is associated with a strip of web VB attached, for example adhesively bonded, along its longitudinal edges so that the top mesh G2, where applicable associated with a web V, covers the folded part of the strip of web VB, which helps to form the edge of the board. FIG. 11 combines the features described with reference to FIGS. 9 and 10, in other words it is the bottom mesh G1 and the strip of web VB that cover the top mesh G2 and its web V. Of course, the bottom mesh G1 could equally carry a web, such as the web V; accordingly, FIGS. 12-15 illustrate situations in which the bottom mesh G1 carries a web V, the remainder being as in FIGS. 8, 9 with a top mesh G2 with no web, FIGS. 12-13, or with a web V, FIGS. 14-15; the mesh G1 is covered by the web V over the whole of its width. FIGS. 16, 17 show a disposition analogous to that of FIGS. 12, 13, in which the web V associated with the bottom mesh G1 has been replaced by a lateral strip of web VB.

The web VB in the form of a strip covers only the lateral edges of the mesh G1 and/or G2; accordingly, the top mesh G2 at least partly covers a portion of the bottom mesh G1, whether associated or not with a web V, VB; alternatively, the top mesh G2 is at least partly covered by a portion of the mesh G1, whether associated or not with a web V, VB.

Alternatively, the top lip 39 is the lower generatrix of a cylindrical roller mounted to rotate about a transverse axis.

A layer of latex type polymer emulsion (or one with organic solvent) is advantageously deposited on one or both faces of the board; thus a protective film is obtained on the surface of the board. The protective film in particular reduces the permeability of the board, improves the surface appearance, facilitates the adhesion of any covering, such as tiles, and to some degree limits dimensional variations of the board. The protective film can be deposited by surface spraying, by coating with rollers, by impregnating the mesh or meshes, whether or not associated with a web, by passage through a bath or by passage between rollers.

The invention claimed is:

1. A board wherein the board body comprises a binder containing Portland cement, a sulfoaluminous clinker and a source of calcium sulfate, characterized in that the binder includes, by weight: 30 to 80% of Portland cement, 20 to 70% of sulfoaluminous clinker, 5 to 20% of a source of calcium sulfate and 0.4 to 7% of at least one water reducer plasticizer additive or high water reducer superplasticizer additive, and in that said board body includes lightweight aggregates.

2. A board according to claim 1, characterized in that the light aggregates are in proportions such that the final specific gravity of the board body is about 1.

3. A board according to claim 1, characterized in that the final specific gravity of the board body is of the order of 0.8 to 1.5.

4. A board according to claim 1, characterized in that the sulfoaluminous clinker has a $C_4A_3\overline{S}$ content greater than approximately 30%.

5. A board according to claim 1, characterized in that the additive includes a polymelamine sulfonate.

6. A board according to claim 1, characterized in that the additive includes a poly (meth) acrylate.

7. A board according to claim 1, characterized in that it includes a second additive which is a retarder.

8. A board according to claim 7 characterized in that it contains up to approximately 2% of the second additive.

9. A board according to claim 7, characterized in that the second additive contains polymethacrylate, citric acid or a gluconate.

10. A board according to claim 1, characterized in that it further includes an alkali carbonate additive.

11. A board according to claim 10, characterized in that the a alkali carbonate is $Li_2CO_3$.

12. A board according to claim 1, characterized in that the source of calcium sulfate is plaster, gypsum or anhydrite.

13. A board according to claim 1, characterized in that the contribution of sulfate by the source of calcium sulfate is such that the mass ratio r is from 2 to 2.5, where the mass ratio r is defined by the following equation:

$$r = [(SO_3)_a + (SO_3)_b]/(SO_3)_c$$

in which:
- $(SO_3)_a$ is the content of sulfate coming from the source of calcium sulfate,
- $(SO_3)_b$ is the content of free sulfate coming from the sulfoaluminous clinker, and
- $(SO_3)_c$ is the content of sulfate coming from the calcium sulfoaluminate contained in the sulfoaluminous clinker.

14. A board according to claim 1, characterized in that the Portland cement content is from 50 to 70% by weight of the binder.

15. A board according to claim 1, characterized in that the approximate Blaine specific surface area of the Portland cement is from 2500 to 6000 cm²/g and that of the sulfoaluminous clinker is from 2500 to 7000 cm²/g.

16. A board according to claim 1, characterized in that water is added to it in an approximate water/binder ratio by weight from 0.2 to 0.5.

17. A board according to claim 1, characterized in that it comprises 60 g of Portland cement, 30 g of sulfoaluminous clinker, 10 g of gypsum, 2 to 4 g of polymelamine sulfonate and 30 g of water.

18. A board according to claim 1, characterized in that it comprises 60 g of Portland cement, 30 g of sulfoaluminous clinker containing 56% $C_4A_3\overline{S}$, 10 g of plaster, 2 g of polymelamine sulfonate and 30 g of water.

19. A board according to claim 1, characterized in that it comprises 50 g of Portland cement, 43 g of sulfoaluininous clinker containing 35% of $C_4A_3\overline{S}$, 7 g of plaster, 2 g of polymelamine sulfonate and 30 g of water.

20. A board according to claim 1, characterized in that it comprises 36 to 76 g of Portland cement, 54 to 14 g of sulfoaluminous clinker, 10 g of plaster, 2 g of polymelamine sulfonate and water in a water/binder mass ratio of 0.3.

21. A board according to claim 1, characterized in that it comprises 60 g of Portland cement, 30 g of sulfoaluminous clinker, 10 g of plaster, 2 g of polymelamine sulfonate, 30 g of water and 2 g of expanded polystyrene balls.

22. A board according to claim 1, characterized in that it comprises 47 to 68 g of Portland cement, 43 to 22 g of sulfoaluminous clinker, 10 g of plaster, 2 g of polymelamine sulfonate, 30 g of water and 2 g of expanded polystyrene balls.

23. A board according to claim 1 characterized in that it comprises 60 g of Portland cement with a Blaine specific surface area from 3720 to 5040 cm²/g, 30 g of sulfoaluminous clinker with a Blaine specific surface area equal to 4500 cm²/g, 10 g of plaster, 2 g of polymelamine sulfonate, 30 g of water and 2 g of expanded polystyrene balls.

24. A board according to claim 1, characterized in that it comprises 60 g of Portland cement with a Blaine specific surface area equal to 3720 cm²/g, 30 g of sulfoaluminous clinker having a Blaine specific surface area from 3800 to5000 cm²/g, 10 g of plaster, 2 g of polymelamine sulfonate, 30 g of water and 2 g of expanded polystyrene balls.

25. A board according to claim 1, characterized in that it comprises 60 g of Portland cement, 30 g of sulfoaluminous clinker, 10 g of gypsum, 2 g of polymelamine sulfonate, 0.3 to 1 g of polymethacrylate and 30 g of water.

26. A board according to claim 1, characterized in that it includes 60 to 69 g of Portland cement, 30 to 21 g of sulfoaluminous clinker, 10 g of plaster, 2 g of polymelamine sulfonate, 1 g of polymethacrylate, 30 g of water and 2 g of expanded polystyrene balls with a size $\leq 1$ mm.

27. A board according to claim 1, characterized in that it comprises 40 g of Portland cement, 45 g of sulfoaluminous clinker, 15 g of plaster, 1.5 g of polymelamine sulfonate, 0.3 g of polymethacrylate, 30 g of water and 1.5 g of expanded polystyrene balls with a size $\leq 1$ mm.

28. A board according to claim 1, characterized in that it comprises 40 g of Portland cement, 45 g of sulfoaluminous clinker, 15 g of plaster, 1.5 g of polymelamine sulfonate, 0.3 g of polymethacrylate, 0.5 g of alkali carbonate, 30 g of water and 1.5 g of expanded polystyrene balls with a size $\leq 1$ mm.

29. A board according to claim 1, characterized in that it comprises 60 g of Portland cement, 30 g of sulfoaluminous clinker, 10 g of gypsum, 2 g of polymelamine sulfonate, 0.4 to 1.5 g of citric acid and 30 g of water.

30. A board according to claim 1, characterized in that it comprises 60 g of Portland cement, 30 g of sulfoaluminous clinker, 10 g of gypsum, 2 g of polymelamine sulfonate, 0.25 to 1.5 g of gluconate and 30 g of water.

31. A board according to claim 1, characterized in that it comprises 60 g of Portland cement, 30 g of sulfoaluminous clinker, 10 g of gypsum, 0.6 to 2 g of polymethacrylate and 30 g of water.

32. A board according to claim 16, characterized in that the approximate water/binder ratio is from 0.25 to 0.4 by weight.

33. A board according to claim 28, characterized in that said alkali carbonate is $Li_2CO_3$.

* * * * *